July 22, 1930. C. R. REID 1,771,351
REVERSIBLE STEAM ENGINE
Filed July 23, 1928 7 Sheets-Sheet 4
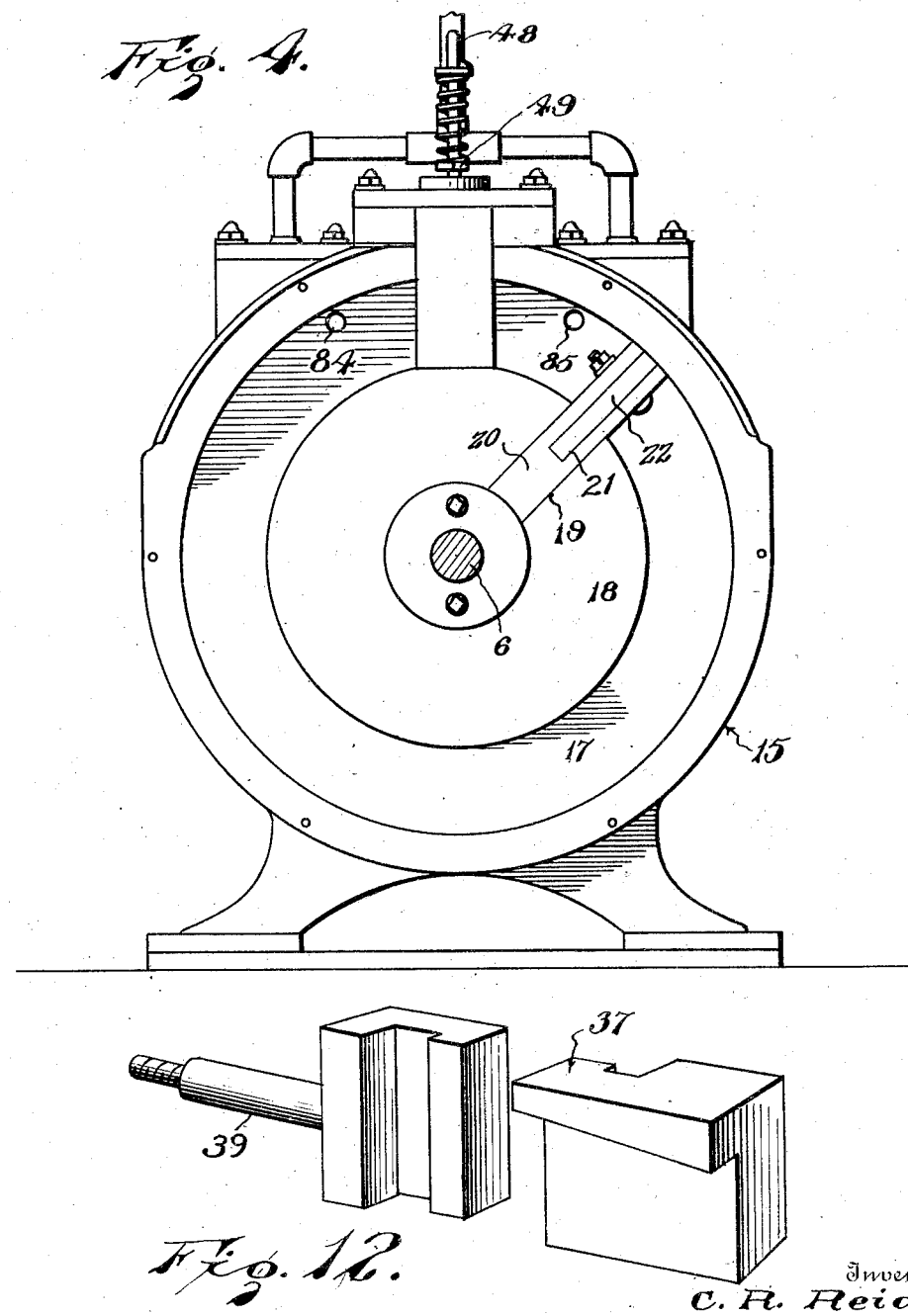

July 22, 1930.                C. R. REID                1,771,351
                        REVERSIBLE STEAM ENGINE
                   Filed July 23, 1928      7 Sheets-Sheet 5
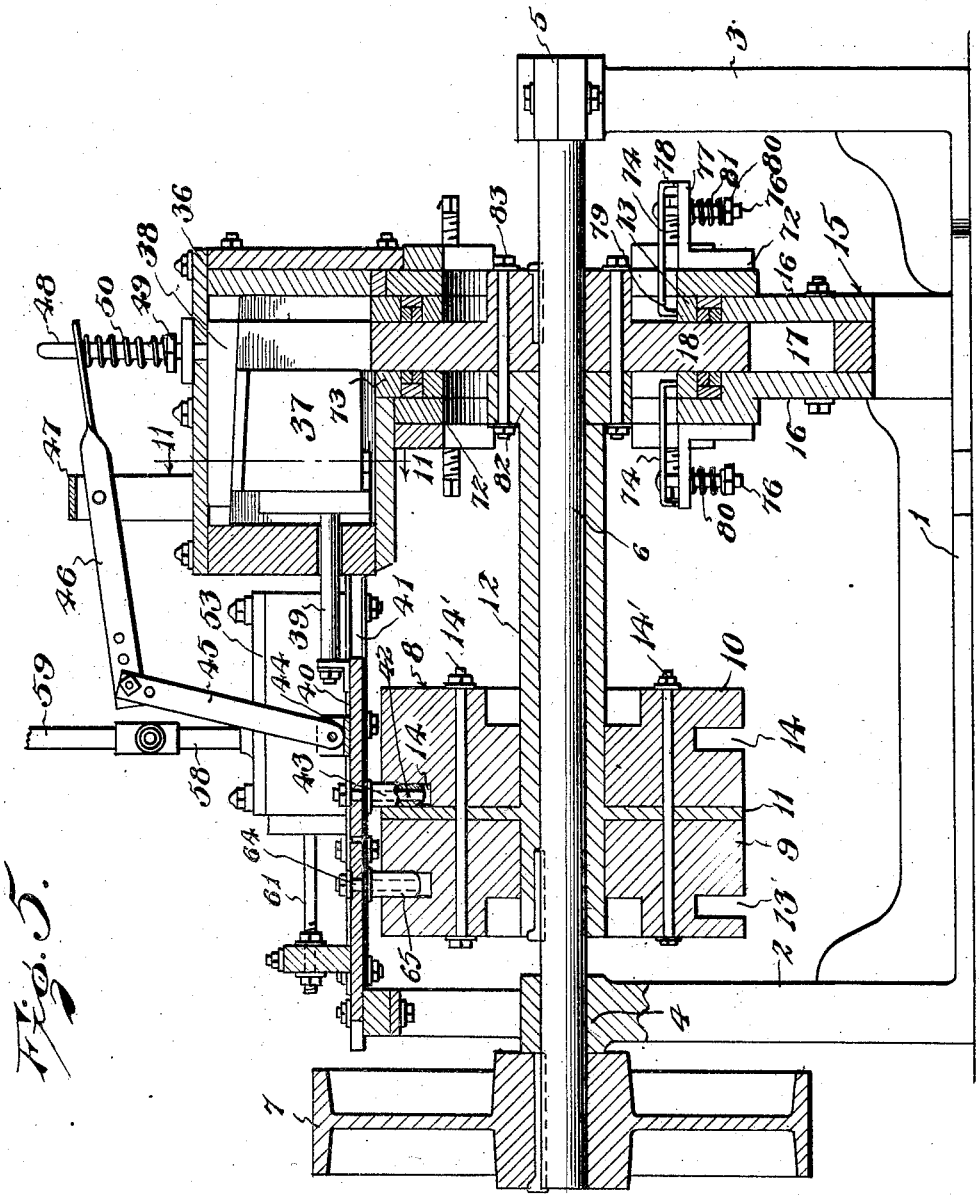
Inventor
C. R. Reid
By Lacey & Lacey, Attorneys

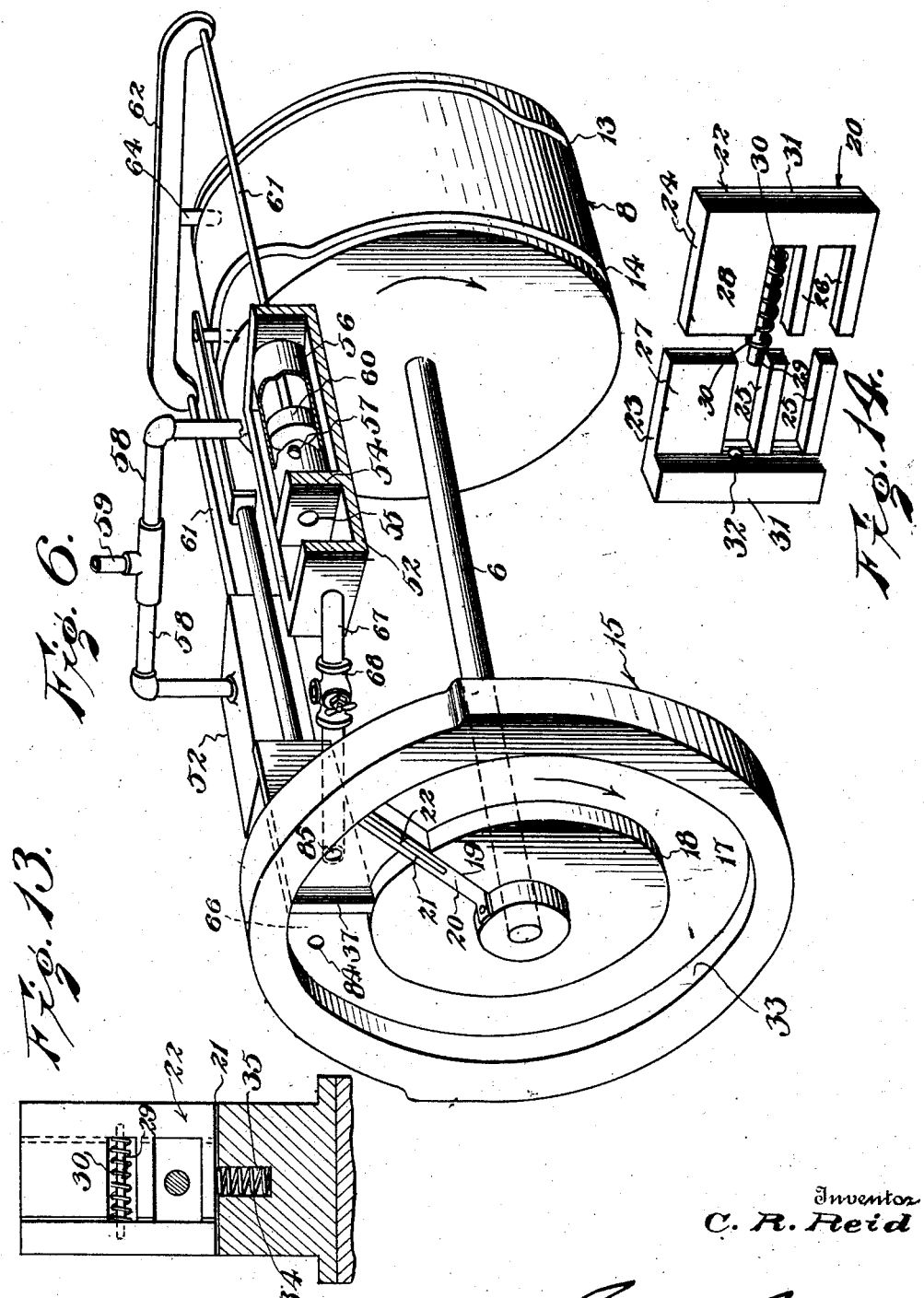

July 22, 1930.  C. R. REID  1,771,351
REVERSIBLE STEAM ENGINE
Filed July 23, 1928    7 Sheets-Sheet 7

Inventor
C. R. Reid

Patented July 22, 1930

1,771,351

UNITED STATES PATENT OFFICE

CHARLES R. REID, OF HEIDELBERG, MISSISSIPPI

REVERSIBLE STEAM ENGINE

Application filed July 23, 1928. Serial No. 294,730.

The present invention is directed to improvements in reversible steam engines, and is an improvement of my Patent No. 1,056,833, issued March 25, 1913.

One of the objects of the invention is to provide novel means whereby the sliding abutment will be yieldably held in engagement with the periphery of rotor.

Another object of the invention is to provide a device of this character so constructed that it can be reversed in a simple manner.

Another object of the invention is to provide a device of this character which can be employed for pumping fluids, such as water, oil and gasoline.

Another object of the invention is to provide novel means for adjusting the rotor packing.

With these and other objects in view, this invention resides in the novel features of construction, formation, combination and arrangement of parts to be hereinafter more fully described, claimed and illlustrated in the accompanying drawings, in which:—

Figure 4 is an end view with one of the ring plates removed.

Figure 5 is a longitudinal sectional view.

Figure 6 is a skeleton perspective view.

Figure 12 is a perspective view of the sliding abutment.

Figure 13 is a detail view of the radial blades.

Figure 14 is a detail perspective view of the blade packing.

Figure 1:
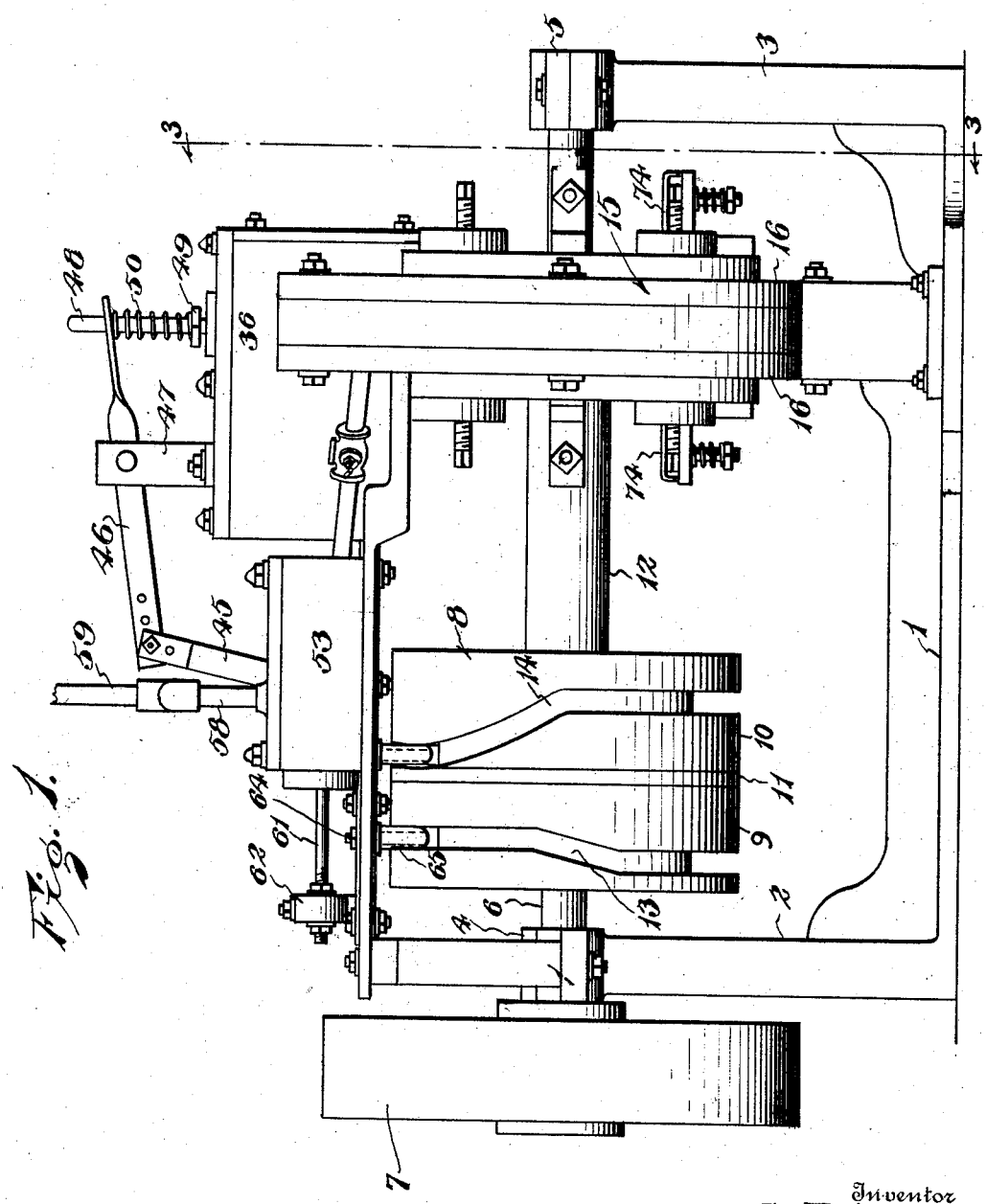
Figure 1 is a side view.
Figure 2:
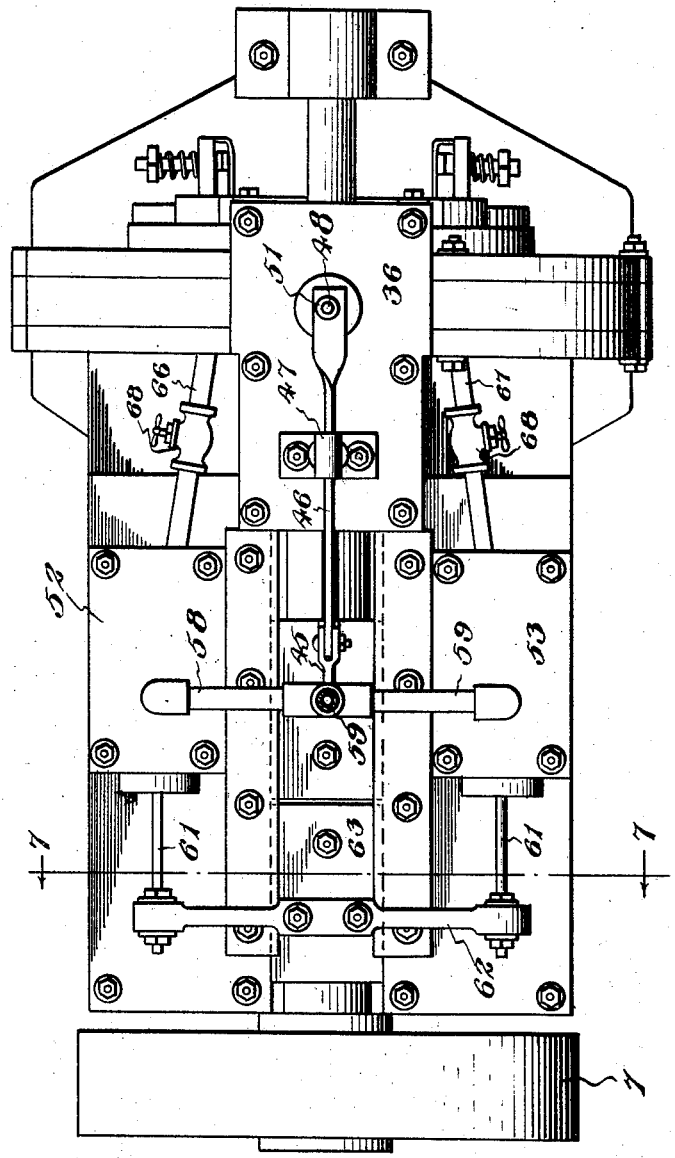
Figure 2 is a top plan view.
Figure 3:
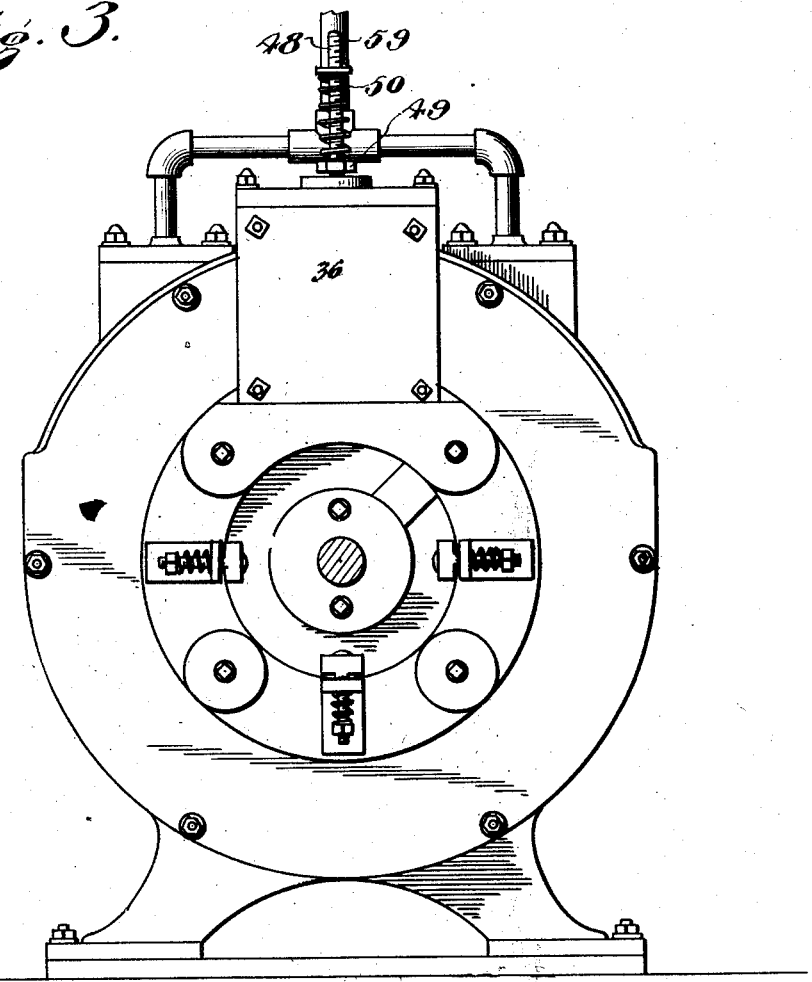
Figure 3 is a sectional view on line 3—3 of Figure 1.
Figure 11:
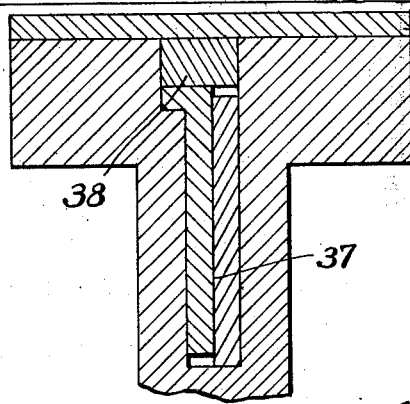
Figure 11 is a sectional view on line 11—11 of Figure 5.
Figure 7:
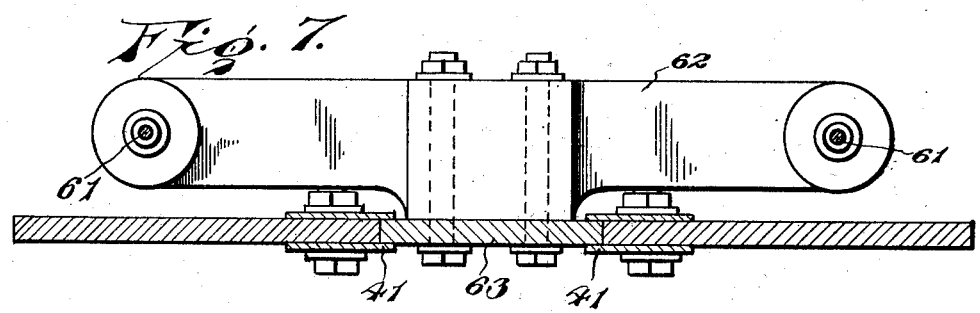
Figure 7 is a sectional view on line 7—7 of Figure 2.
Figure 8:
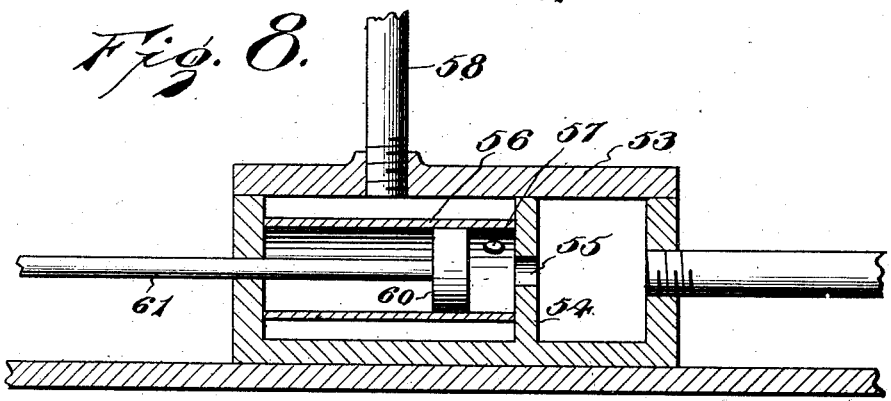
Figure 8 is a longitudinal, sectional view through one of the valve chests.
Figure 9:
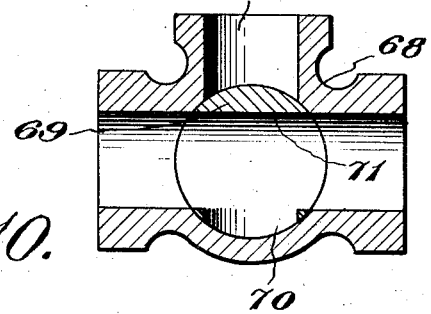
Figure 9 is a sectional view through one of the valves.
Figure 10:
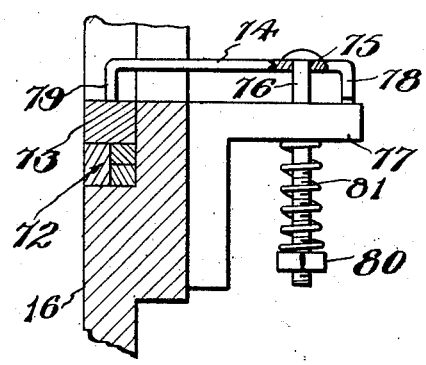
Figure 10 is a detail sectional view of the packing adjustor.

Referring to the drawings, 1 designates a bed plate having rising from its ends pedestals 2 and 3, provided with bearings 4 and 5, respectively, and in which is journaled the shaft 6 and upon one end of which is fixed the pulley 7. A cam 8 is employed and consists of sections 9 and 10, which are engaged upon opposite sides of the circular flange 11 of the sleeve 12, said sleeve being keyed to the shaft 6. The sections 9 and 10 are provided, respectively, with cam tracks 13 and 14, the purpose of which will be later explained. The sections are secured by bolts 14' in order that they can be conveniently attached to or removed from the flange 11.

The rotor casing 15 is supported upon the bed plate 1 and consists of a pair of ring plates 16—16 spaced to provide a steam or other fluid space 17 to accommodate the rotor 18, said rotor having a radial recess 19 therein in which is fitted the radial impeller blade 20, said blade having a slot 21 in which is mounted a packing member 22 which consists of sections 23 and 24, said sections having extensions 25 and 26, and plates 27 and 28 adapted to slidably overlap. To the section 24 is secured a pin 29 and upon which is engaged a coil spring 30 which serves to force the sections apart in order that the sides 31—31 thereof will yieldably engage the inner sides of the ring plates 16—16 to prevent fluid leakage. The pin 29 interlocks the sections 23 and 24 when it is engaged in the opening 32 of the section 23, and in order to hold the outer ends of the sections yieldably engaged with the annular wall 33 of the rotor casing a coil spring 34 is engaged in a recess 35 of the blade and with the ends of the sections.

A casing 36 is mounted upon the rotor casing 15 and in which is mounted the sliding abutment 37, and since the construction thereof is the same as that of my former patent, a detailed description thereof is not thought necessary.

As in my former patent there is a platen 38 mounted in the casing 36 which rests upon the abutment 37. The abutment has its rod 39 fixed to the slide 40 movable in the guide grooves 41, the said slide having a pin 42 carried thereby and upon which is mounted an anti-friction sleeve 43, for engagement in the cam track 14. This slide has a bracket 44 to which is pivotally connected the lower end of the link 45, said link having its upper end pivotally and adjustably connected to the inner end of the bar 46, said bar being pivotally connected intermediate its ends to a bracket 47 mounted upon the top of the casing 36. A plunger is provided and has threaded thereon a nut 49 and upon which rests the coil spring 50, the upper end of said spring being engaged by the outer end of the bar 46 which is provided with an opening 51 to accommodate the plunger 48. The lower end of the plunger extends through the top of the casing 36 and is impinged against the platen 38, as clearly shown in Figure 5.

A pair of valve chests 52 and 53 is employed and have mounted therein transverse partitions 54 in which are formed ports 55, there being cylinders 56 fitted between the partitions and rear walls of the chests, said cylinders having inlet ports 57 formed therein in order that steam can pass from the cylinder and through the ports 55.

Steam is conducted to the chest through the branch pipes 58 through a pipe 59 which leads from a suitable source of steam supply.

Movable in the cylinders 56 are valves 60, the stems 61 thereof being connected to a cross arm 62, said arm being fixed to a slide 63 which slides in the guide grooves 41. The slide 63 has carried thereby a pin 64 upon which is rotatably mounted the anti-friction sleeve 65 for engagement in the cam track 13.

Leading from the chests 52 and 53 are pipes 66 and 67 respectively, each having a valve casing 68 connected thereto and in which are rotatably mounted turning plugs 69 provided with intersecting passages 70 and 71. The casing 68 and plug 69 constitute a three-way valve which has an outlet 70′ for escape of the exhaust into the atmosphere. By proper setting of the three-way valve, the engine may be reversed.

Mounted in the peripheries of the ring plates 16—16 are packing rings 72 which are confined by the larger rings 73. In order to maintain the rings 72 expanded for engagement with the inner peripheries of the ring plates 16—16 a plurality of plates 74 are employed and are provided with openings 75 for engagement with the bolts 76 carried by the brackets 77, said brackets being carried by the rotor casing. The plates have projections 78 and 79 upon their ends, the latter resting upon the rings 73 while the former rest upon the brackets 77.

The bolts have engaged therewith nuts 80 and interposed between the nuts and brackets are coil springs 81. It will be obvious that the springs will yieldably hold the plates 74 in engagement with the rings 73, and owing to the presence of the nuts the tension of the springs can be regulated to regulate the pressure of the plates upon the said rings.

It will be observed upon reference to Figure 5 that the sleeve 12 is provided with a head 82 which is secured to the rotor 18 by bolts 83 so that when the rotor is in motion rotary movement will be imparted to the cam 8 in order that the slides 40 and 63 will be reciprocated. The shape of the cam track 14 is such that during rotation of the cam the slide valve will move in order to shift the abutment 37 and actuate the bar 46 in proper timed relationship.

The pipes 66 and 67 are so arranged that they connect with ports 84 and 85 which open upon opposite sides of the abutment 37.

The general operation will be best understood upon reference to Figure 6, wherein the abutment 37 is shown extended and engaged with the periphery of the rotor 18, and at which time the plug 69 carried by the pipe 67 has its passage 71 is a position to permit steam from the chest 52 to flow into the space 17 and between the blade 20 and abutment, the expansive action of the steam causing the blade to travel, thus rotating the shaft 6 in order that power may be taken from the pulley 7. The plug in the pipe 66 will be adjusted in order that steam from the chest 53 cannot enter the said pipe, but the exhaust steam can pass therethrough from the port 84 and to atmosphere. Obviously when it is desired to reverse the travel of the rotor it is only necessary to cut off the supply of steam from the pipe 67 and permit the fluid to pass into the space from the pipe 66.

The shape of the cam track 13 is such that the valve 60 will be moved in order that steam will be intermittently permitted to flow from the cylinders 56, through the ports 57 and into either of the pipes 66 or 67, according to the direction in which the rotor is traveling. The shape of the cam track 13 is such that steam will not be admitted to the space 17 until a time when the blade 20 is adjacent the abutment 37, and the steam will be permitted to flow into the chamber until the blade has reached the position wherein the expansive force of the steam has spent itself and is ready to exhaust, after which the valve is again adjusted to permit another charge of steam.

The shape of the cam track 14 is such that it causes the slide 40 to move forwardly in order to swing the forward end of the bar 46 downwardly to compress the spring 50 and which exerts its force upon the nut 49, whereby the plunger 48 will press downwardly on the platen 38 to hold the abutment 37 in yielding engagement with the periphery of the rotor 18, immediately after the blade 20 passes said abutment.

Should it be desired to utilize the device for pumping water or other fluid it is only necessary to connect a pipe, provided with a check valve, to the supply pipe 59 in order that the fluid will be conducted through a valve chest and to the space 17 of the rotor casing, whereupon it will be forced from the opposite turning plug to its point of use.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

1. In a rotary engine, a casing, a rotor mounted therein, packing rings in the casing for engagement with the sides of the rotor, plates pivotally supported by the casing, rings encircling the packing rings, said plates yieldably engaging the latter rings for holding the packing rings expanded.

2. In a rotary engine, a casing, a bladed rotor in the casing, an abutment slidable transversely of the rotor, a platen engaged with the abutment, a shaft fixed to the rotor, a cam driven by the shaft, a slide controlled by the cam, a plunger engaged with the platen, and means operable by the slide for operating the abutment and yieldably holding the plunger engaged with the platen and the abutment yieldably engaged with the periphery of the rotor.

3. In a rotary engine, a casing having a bladed rotor movable therein, a shaft for the rotor, a cam driven by the shaft, an abutment, valve chests having cylinders therein, pipe connections between the chest and casing, and communicating with the casing upon opposite sides of the abutment, valves reciprocable in the cylinders, a pair of slides movable in opposite directions by the cam, means connecting one slide and valve for controlling the passage of fluid through the pipe connections, a platen bearing upon the abutment, a link pivotally supported by the casing, a plunger connected with one end of the link, a bar having its upper end pivotally connected with the link and its lower end pivotally connected with the other slide, and a spring encircling the plunger for yieldably holding the plunger engaged with the platen during reciprocation of the latter slide.

In testimony whereof I affix my signature.

CHARLES R. REID. [L. S.]